(12) United States Patent
Distefano et al.

(10) Patent No.: US 12,514,809 B2
(45) Date of Patent: Jan. 6, 2026

(54) COSMETIC COMPOSITION WITH OPTIMIZED STARCH AND COSMETIC APPLICATIONS THEREOF

(71) Applicant: INTERCOS S.p.A., Milan (IT)

(72) Inventors: Gaetano Distefano, Bergamo (IT); Patrizia Valsesia, Calco LC (IT)

(73) Assignee: INTERCOS S.P.A., Milan (IT)

( * ) Notice: Subject to any disclaimer, the term of this patent is extended or adjusted under 35 U.S.C. 154(b) by 665 days.

(21) Appl. No.: 17/908,132

(22) PCT Filed: Mar. 1, 2021

(86) PCT No.: PCT/EP2021/055030
§ 371 (c)(1),
(2) Date: Aug. 30, 2022

(87) PCT Pub. No.: WO2021/175775
PCT Pub. Date: Sep. 10, 2021

(65) Prior Publication Data
US 2023/0086493 A1     Mar. 23, 2023

(30) Foreign Application Priority Data

Mar. 5, 2020    (IT) .................... 102020000004687

(51) Int. Cl.
*A61K 8/73* (2006.01)
*A61K 8/02* (2006.01)
*A61Q 1/10* (2006.01)

(52) U.S. Cl.
CPC ............. *A61K 8/732* (2013.01); *A61K 8/022* (2013.01); *A61K 8/025* (2013.01); *A61Q 1/10* (2013.01)

(58) Field of Classification Search
None
See application file for complete search history.

(56) References Cited

U.S. PATENT DOCUMENTS

| | | | |
|---|---|---|---|
| 3,622,389 A | 11/1971 | Brelsford et al. | |
| 4,421,128 A * | 12/1983 | Boulogne | A61K 8/732 132/218 |
| 2007/0140995 A1 | 6/2007 | Kenar et al. | |
| 2016/0038397 A1 * | 2/2016 | Markland | A61Q 19/10 424/70.13 |
| 2020/0368134 A1 * | 11/2020 | Jang | A61K 8/60 |

FOREIGN PATENT DOCUMENTS

| | | | |
|---|---|---|---|
| CN | 88100041 | * | 9/1988 |
| CN | 108014027 | | 5/2018 |
| CN | 108158941 | | 6/2018 |
| CN | 108902407 | | 11/2018 |
| EP | 0 565 043 | | 10/1993 |
| FR | 1033530 | | 7/1953 |
| JP | 2005170864 | * | 6/2005 |
| WO | 2007/007296 | | 1/2007 |
| WO | 2010/119000 | | 10/2010 |
| WO | 2017/134633 | | 8/2017 |

OTHER PUBLICATIONS

"Physicochemical properties, modifications and applications of starches from different botanical sources", May 2015.*
Donnerstag "Why you shall consider adding rice starch to your formulations" Sep. 2019.*
Ikechi et al. "Evaluation of Starch from Ginger and Cassava as Pharmaceutical Tablet Excipient" Feb. 2018.*
Rios-Rios et al. "Physicochemical and Nutritional Characterization of Starch Isolated from Colocasia antiquorum Cultivated in Oaxaca, Mexico" May 2016.*
Mung Bean Mintel reference—as cited on IDS.*
International Search Report (ISR) and Written Opinion of the International Searching Authority issued May 6, 2021 in International (PCT) Application No. PCT/EP2021/055030.
International Preliminary Report on Patentability issued Aug. 8, 2022 in International (PCT) Application No. PCT/EP2021/055030.
Written Opinion of the International Preliminary Examining Authority issued Feb. 14, 2022 in International (PCT) Application No. PCT/EP2021/055030.
Written Opinion of the International Preliminary Examining Authority issued Jun. 10, 2022 in International (PCT) Application No. PCT/EP2021/055030.
Database GNPD [Online] MINTEL; anonymous: 11Mung Bean Starch, XP055751934, retrieved from www.gnpd.com Database accession No. 4591931 the whole document, Feb. 2, 2017, cited in ISR.
Magali Leonel et al., "New starches for the food industry: *Curcuma longa* and *Curcuma zedoaria*", Carbohydrate Polymers, vol. 54, No. 3, pp. 385-388, Nov. 1, 2003, cited in ISR.

* cited by examiner

*Primary Examiner* — Danah Al-Awadi
(74) *Attorney, Agent, or Firm* — Wenderoth, Lind & Ponack, L.L.P.

(57) ABSTRACT

Native or physically or chemically modified starches, consisting of insoluble native particles with a smooth surface, free of edges, harshness, and roughness of any kind, are used as ingredients for cosmetic compositions. The particles can be of a regular spheroidal shape with diameter between 0.1 and 60 microns or of a lenticular/lamellar shape with diameter between 5 and 60 microns and thickness between 0.5 and 15 microns. Using such starches allows obtaining cosmetic compositions with high aesthetic features.

10 Claims, 6 Drawing Sheets

Figure 1 – Starches commonly used in cosmetics

| Origin | Shape | diameter / microns range | SEM images |
|---|---|---|---|
| Corn | Irregular with edges | 5-15 | 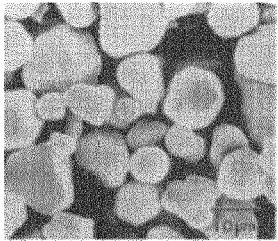 |
| Oats | Irregular with edges | 2-15 | 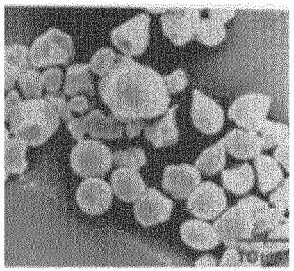 |
| Rice | Irregular with edges | 3-8 | 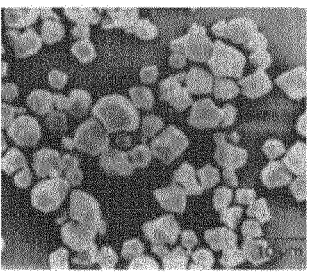 |
| Potato | Rounded irregular | 12-75 | 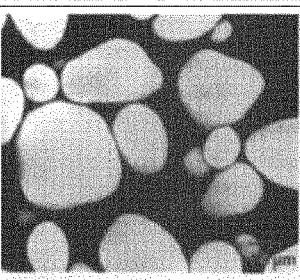 |
| Tapioca | Irregular with edges | 5-25 | 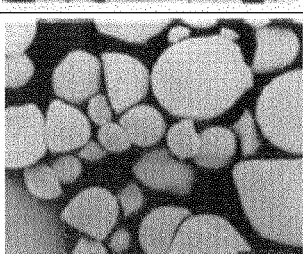 |
| Wheat | Lenticular (Starch A)<br><br>Irregular spheroidal (Starch B) | Starche A:<br>Face: 22-36<br>Thickness: 6-10<br><br>Starch B:<br>2-3<br><br>(bimodal) | 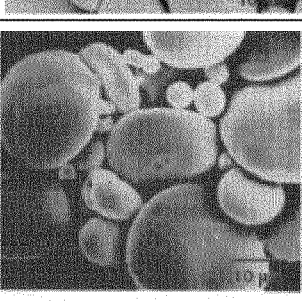 |

Figure 2 – Starches from selected morphology
| Origin | Shape | diameter / microns range | SEM images |
|---|---|---|---|
| Ginger | Lenticular /Discoid | Face: 10-60<br>Thickness: 5-10 | 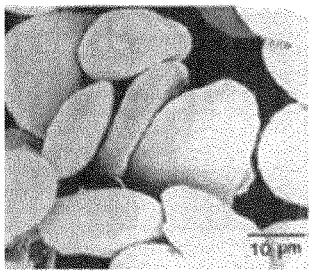 |
| White Turmeric | Lenticular | Face: 10-60<br>Thickness: 1-3 | 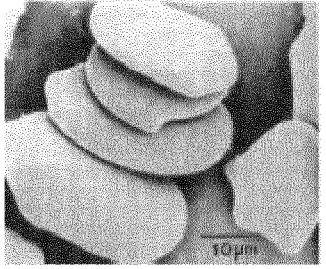 |
| Diffembachia | Lenticular | Face: 10-80<br>Thickness: 5-15 | 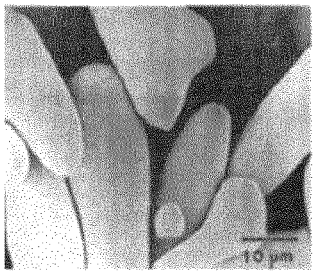 |
| Wheat (Type A starch only) | Lenticular | Face: 22-36<br>Thickness: 6-10 | 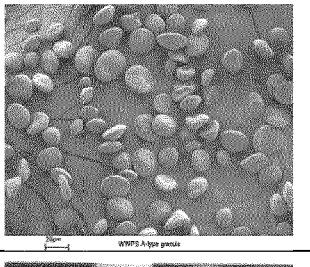 |
| Maranta | Regular spheroidal | 8-30 | 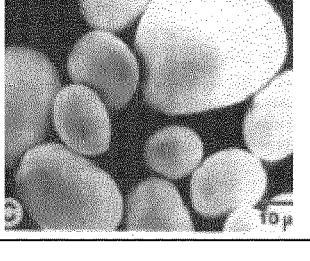 |

Figure 3 – Starches from selected morphology
| Origin | Shape | diameter / microns range | SEM images |
|---|---|---|---|
| Sweet potato | Regular spheroidal | 5-25 | 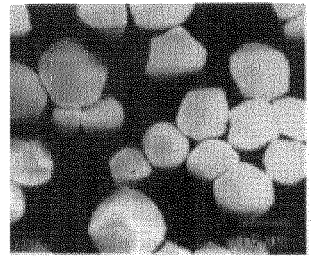 |
| Pearl millet | Regular spheroidal | 3-15 | 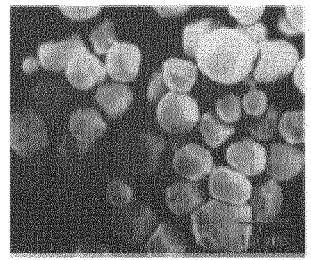 |
| Mung bean | Regular spheroidal | 10-27 | 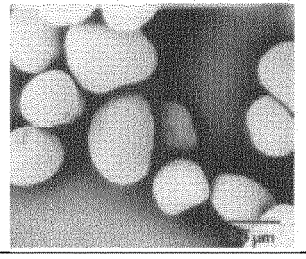 |
| Bean | Regular spheroidal | 10-45 | 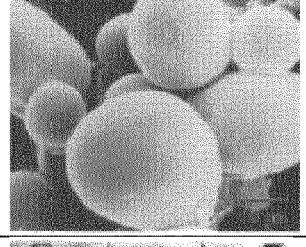 |
| Chickpea | Regular spheroidal | 10-27 | 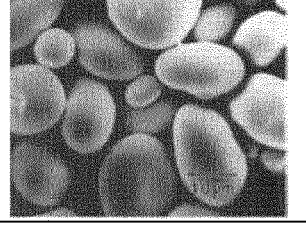 |

Figure 4 – Starches from selected morphology
| Origin | Shape | diameter / microns range | SEM images |
|---|---|---|---|
| Lentil | Regular spheroidal | 10-20 | 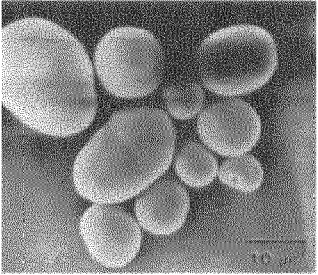 |
| Pea | Regular spheroidal | 10-45 | 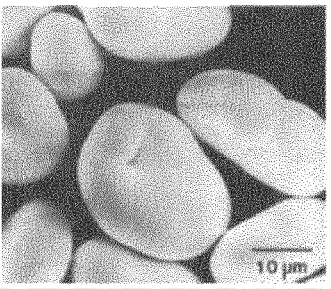 |
| Black-eyed beans | Regular spheroidal | 10-35 | 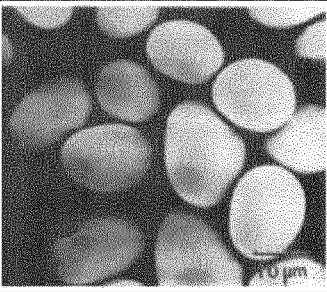 |
| Avocado | Regular spheroidal | 10-27 | 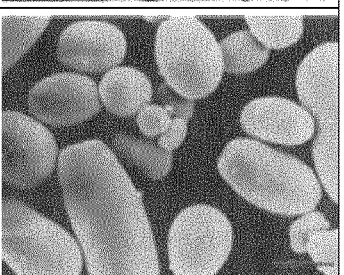 |
| Pejibaye | Regular spheroidal | 3-10 | 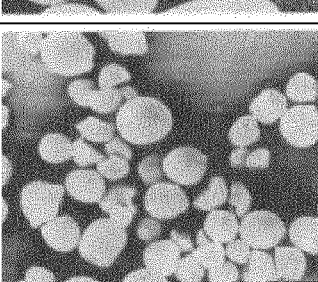 |

Figure 5 – Starches from selected morphology
| Origin | Shape | diameter / microns range | SEM images |
|---|---|---|---|
| Taro (Chinese) | Regular spheroidal | 1-4 | 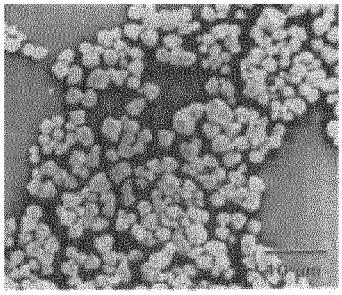 |
| Taro (Iliuaua Dasheen) | Regular spheroidal | 0.5-3 |  |
| Amaranth | Regular spheroidal | 0.5-2 | 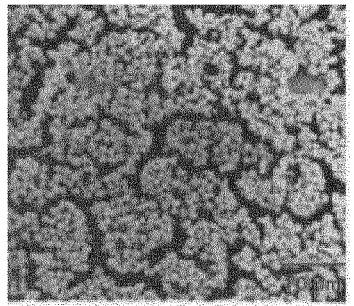 |
| Vaccaria | Regular spheroidal | 0.5-2 | 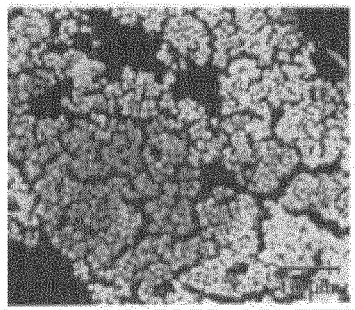 |
| Parsnip | Regular spheroidal | 1-6 | 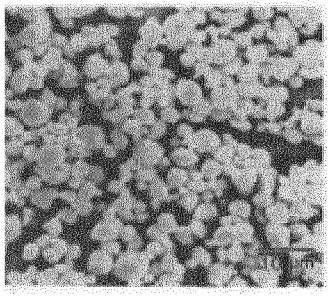 |

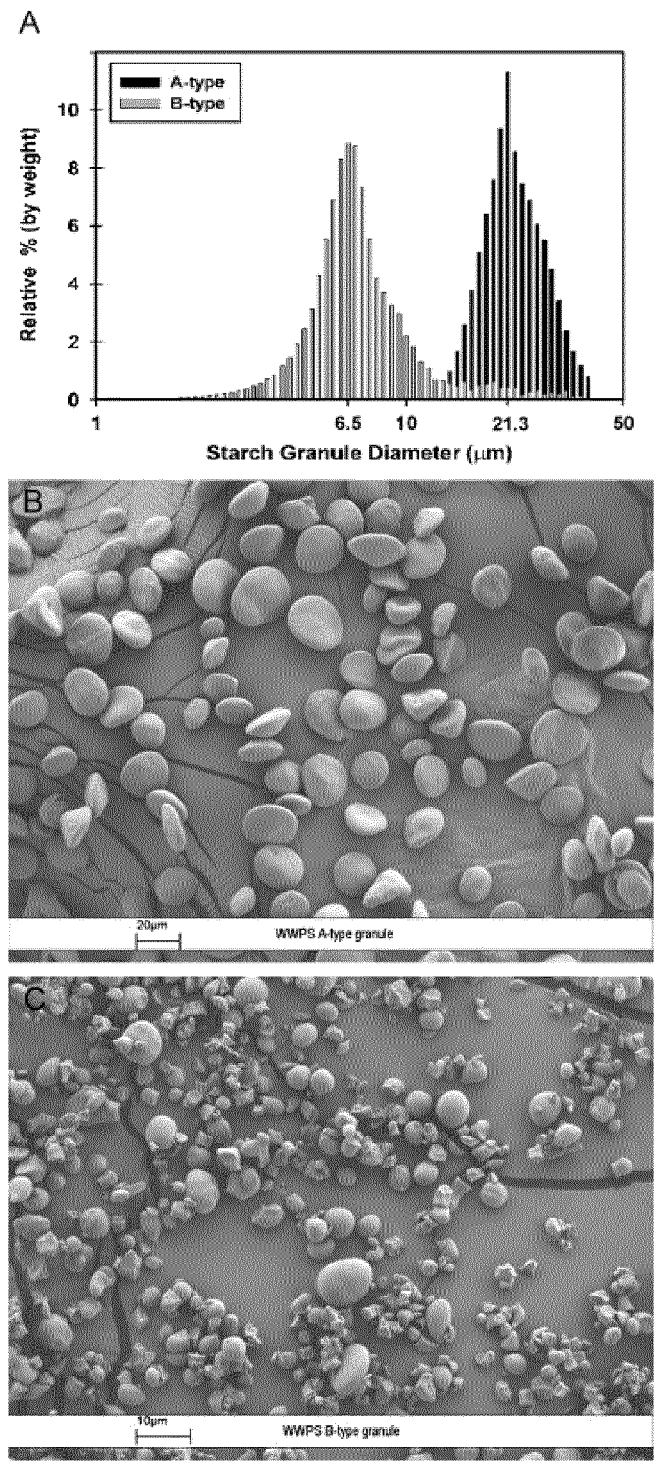
Figure 6 - SEM Microscopy of wheat starch,
bimodal distribution (top), type A starch (in the middle)
and type B starch (bottom).

COSMETIC COMPOSITION WITH OPTIMIZED STARCH AND COSMETIC APPLICATIONS THEREOF

The present invention relates to a cosmetic composition with optimized starch, and to cosmetic products obtained with said cosmetic composition.

In order for a cosmetic raw material, especially if in powder form, to be acceptable from the point of view of sensory aesthetics, it is required to engineer or select the shape and size of the particles so as to have sufficiently small particles of spherical/spheroidal or lamellar shape, preferably having a smooth surface free of roughness.

Perfect sizes range from 0.1 microns to 50 microns, because in this range the particles are not perceived individually and are impalpable when touched. It should also be considered that the simple grinding of materials of higher grain size leads to obtaining particles of irregular shape. Irregular shapes, with roughness and edges, cause unpleasant sensations of dryness with a chalky-like touch.

For this reason, the particles used in cosmetics are preferably of spherical/spheroidal or lamellar/lenticular morphology.

The lamellar particles are characterized by a smooth touch and are marked by a strong adhesion to the epidermis, thanks to the interaction between the skin surface and the face of each lamella. Raw materials for this purpose in the art are for example phyllosilicates (talc, natural mica, synthetic mica), graphite, hexagonal boron nitride and lauroyl lysine. Such ingredients are mainly used as solid excipients and lubricants.

In the aforementioned raw materials, the lamellar morphology is largely determined by the anisotropic nature of the material. For example, talc and mica are phyllosilicates and are marked by a crystalline structure which favors the production of lamellar powders, as the grinding fractures the material along a preferential direction. Graphite, boron nitride and lauroyl lysine also owe the lamellar structure to a crystalline organization in which there is a preferential direction of flaking or growth during crystallization. In this case, the particle size depends on the degree of grinding (silicates, graphite) or on the preparation conditions of the material, by direct synthesis or precipitation (lauroyl lysine, boron nitride, synthetic mica).

Unlike the lamellar particles, the spherical ones enjoy a lower adhesion but a unique touch, thanks to the "ball-bearing" effect which allows to obtain a sophisticated sensoriality. Furthermore, such particles have optical properties adapted to achieve the soft-focus effect. Spherical particles are commonly obtainable from synthesis and the spherical silicas obtained, for example, by so-called Stöber synthesis are known in the art. Polymers, such as for example polymethyl methacrylate or nylon-12, are obtained in spherical form, among other methods, by synthesis in emulsion/dispersion. The monodispersity of the particle size distribution is highly desirable for this kind of powder; homogeneous spherical particles in terms of size emphasize the so-called "ball-bearing" effect.

Spherical raw materials owe the isotropy thereof to the synthesis process in which a spherical symmetry is maintained by growth from a core (silica) or by solidification of drops of liquid monomer during synthesis (in the case of polymers), which is transferred to the final powdery material. The synthesis process also determines the size of the particle, which would not be possible to obtain in a spherical shape by simply grinding a coarser material.

There is currently a growing demand for cosmetic raw materials of natural (renewable) origin and which are biodegradable. This aspect is transversal with respect to all categories of raw materials, and solid raw materials in powder form are no exception. As a consequence of this increased sensitivity, in light of the attention towards microplastic pollution, spherical polymer-type powders have been subject to restrictions of use and the ban thereof is under examination by the authorities. It is therefore required to fill this gap with materials and new ingredients which can replace these cosmetic ingredients.

From the point of view of (bio)degradability and renewable origin, few substances exist which combine both features: among these, it is known that starches can combine natural origin and complete biodegradability in the marine environment. The latter represents the most stringent biodegradability requirement, universally recognized for establishing whether or not a plastic substance should be considered a pollutant.

Starch is a polymer material consisting of two polysaccharides (amylose and amylopectin) through which some plants store energy. Starch is ubiquitous in nature, and mainly potato, corn, rice, and wheat starches find technological application (paper mills, textiles, cosmetics, and food).

The starches are obtained through low-temperature aqueous extraction processes, in which the pulp of the starchy plant is ground in order to break the cell walls and release the starch particles, which are then isolated by filtration, centrifugation, washing and drying. Such processes retain the native morphology of the particles if the process temperature does not exceed the starch solubilization temperature (generally >80° C.).

The use of various starches is reported in the cosmetic field, having an irregular globular shape, surfaces characterized by surface roughness, or poly-dispersed in terms of particle size distribution. In particular, the use of corn, rice starch, oat starch, tapioca starch, and wheat starch is known.

The morphological features and the images of the starches most commonly used in cosmetics obtained by electron microscope are depicted in FIG. 1, attached hereto.

As can be seen from the SEM images in FIG. 1, the commonly used starches are characterized by surfaces provided with edges (as in the case of corn, oats, rice, and tapioca) and, where the surface appears smooth, by a non-spherical shape (potato) and/or by bimodal particle size distribution (wheat).

It is also known in the art that such raw materials are characterized by an unsatisfactory touch, i.e., they generate an unpleasant sensation in the user when pressed between the fingertips of the index and thumb (there is a creaking sensation). This feature prevents the use thereof as the main component in pressed powders, for example.

It is the object of the present invention to produce cosmetic compositions using starches capable of giving the cosmetic product obtained with such compositions a pleasant sensorial aesthetic, in particular from the point of view of pleasant touch.

The aforesaid object is achieved by the cosmetic composition defined in claim 1, in particular using starches formed by native particles with selected morphology (spheroidal or lenticular/lamellar) and dimensions, having a smooth surface free of edges, harshness and roughness of any kind.

In particular, starting from the consideration that the morphology of the starches is determined by the botanical origin from which they are extracted, the present invention has identified a series of starches with a spherical monodisperse morphology or lenticular/lamellar morphology which allow overcoming the problems normally posed by the use of irregularly shaped starches, generating cosmetic products with superior aesthetic features.

Starches formed by native particles characterized by the following morphology were found suitable for the desired cosmetic use:

lamellar/lenticular with lamella thickness between 0.1 and 15 microns and diameter between 5 and 60 microns regular spheroidal with diameter between 0.5 and 60 microns The chemical-physical features of some starches among those identified by the present invention, not used up to now in cosmetics, are indicated by way of explanation in the accompanying FIGS. 2-5, where the SEM images show lenticular or spheroidal starch particles of small diameter and thickness with smooth surface and without edges or roughness.

Such starches can be further improved by a surface treatment (of a chemical and/or physical type) which modifies parameters thereof such as hydrophobicity and the ability to absorb oils. Surface treatment examples are coatings with silicones, oils, waxes, silica (physical) or reactive silanes (chemical).

Furthermore, where the native morphology of the starch shows a multimodal situation (bimodal, trimodal, etc.) the isolation of a noble fraction (for example, but not limited to, by air classification, sieving, decanting) and the use thereof falls within in the present invention. For example, grains often show a bimodal starch distribution, with so-called type A starch and so-called type B starch, each with specific features, as seen in FIG. 6. For example, in the case of wheat starch, a bimodal distribution is noted; the type A starch has a lenticular shape, while the type B starch has an irregular shape. By separating the type A starch from the type B starch, a purified fraction with a specific morphology (lamellar in this case) is available.

The starches described above and depicted in FIGS. 2-5 do not represent an exhaustive list of the possibilities offered by nature. However, as found in laboratory experiments, surprisingly some starches exceed, in terms of cosmetic properties, the currently used starches which do not have an optimized morphology as according to the present invention.

The present invention solves various formulation problems of cosmetic compositions:

1. it overcomes the limitations of the current starches commonly used in cosmetics, identifying the most desirable chemical-physical features and selecting some starches extracted from plants which are different than those used in the cosmetic field;
2. allows the formulator of cosmetic compositions to use renewable and biodegradable raw materials in the marine environment, which are odorless and colorless, to be used as excipients and texturizers in innovative cosmetic formulations.

The formulations of some cosmetic compositions which are obtainable using the starches according to the present invention are indicated below.

EXAMPLE 1—COMPACT POWDER (EYESHADOW)—GINGER STARCH

| Composition | %/weight |
|---|---|
| Talc | 25 |
| Ginger starch | 40 |
| Pigments | 25 |
| Silica | 4 |
| Binders | 5 |
| Preservatives | 1 |
| | 100 |

EXAMPLE 2—COMPACT POWDER (EYESHADOW)—MUNG BEAN STARCH

| Composition | %/weight |
|---|---|
| Talc | 55 |
| Mung Bean Starch | 10 |
| Pigments | 25 |
| Silica | 4 |
| Binders | 5 |
| Preservatives | 1 |
| | 100 |

EXAMPLE 3—COMPACT POWDER (EYESHADOW)—PHYSICALLY-MODIFIED MUNG BEAN STARCH

| Composition | %/weight |
|---|---|
| Talc | 55 |
| Physically-modified Mung Bean Starch | 10 |
| Pigments | 25 |
| Silica | 4 |
| Binders | 5 |
| Preservatives | 1 |
| | 100 |

EXAMPLE 4—COMPACT POWDER (EYESHADOW)—AMARANTH STARCH

| Composition | %/weight |
|---|---|
| Talc | 25 |
| Amaranth Starch | 40 |
| Pigments | 25 |
| Silica | 4 |
| Binders | 5 |
| Preservatives | 1 |
| | 100 |

EXAMPLE 5—COMPACT POWDER (FACE POWDER)—WHITE TURMERIC STARCH

| Composition | %/weight |
|---|---|
| Talc | 15 |
| White Turmeric Starch | 60 |
| Pigments | 15 |
| Silica | 4 |
| Binders | 5 |
| Preservatives | 1 |
| | 100 |

EXAMPLE 6—COMPACT POWDER (FACE POWDER)—WHITE TURMERIC STARCH AND CHINESE TARO STARCH

| Composition | %/weight |
|---|---|
| Talc | 15 |
| White Turmeric Starch | 60 |
| Chinese Taro Starch | 5 |
| Pigments | 10 |
| Silica | 4 |
| Binders | 5 |
| Preservatives | 1 |
| | 100 |

EXAMPLE 7—COMPACT POWDER (FACE POWDER)—WHEAT STARCH (TYPE A) AND MUNG BEAN STARCH

| Composition | %/weight |
|---|---|
| Talc | 15 |
| Mung Bean Starch | 10 |
| Wheat Starch (Type A) | 55 |
| Pigments | 10 |
| Silica | 4 |
| Binders | 5 |
| Preservatives | 1 |
| | 100 |

EXAMPLE 8—WATER INK—VACCARIA STARCH

| Composition | %/weight |
|---|---|
| Deionized water | 60 |
| Vaccaria Starch | 20 |
| Pigments | 10 |
| Film forming | 3 |
| Preservatives | 1 |
| Rheological modifiers | 5 |
| Humectant | 1 |
| | 100 |

EXAMPLE 9—LIPSTICK—MUNG BEAN STARCH (PHYSICALLY TREATED)

| Composition | %/weight |
|---|---|
| Wax | 20 |
| Oil | 45 |
| Mung Bean Starch, (physically treated) | 10 |
| Pigments | 15 |
| Film forming | 3 |
| Antioxidant | 1 |
| Rheological regulator | 6 |
| | 100 |

EXAMPLE 10—EMULSION—MUNG BEAN STARCH (CHEMICALLY TREATED)

| Composition | %/weight |
|---|---|
| Deionized water | 40 |
| Oil | 30 |
| Mung bean starch, (chemically treated) | 10 |
| Pigments | 10 |
| Emulsifier | 2 |
| Rheological regulator | 3 |
| Preservatives | 1 |
| Rheological regulator | 4 |
| | 100 |

The invention claimed is:

1. A cosmetic face-powder or eye-shadow compact powder product having a composition comprising from 0.1% to 99.9% by weight of at least one starch and from 99.9% to 0.1% by weight of cosmetically acceptable ingredients, wherein the starch is a powder starch consisting of native powder particles having a smooth surface and a regular spheroidal shape with diameter between 0.5 and 60 microns, and
the starch is obtained through an aqueous extraction process at a temperature less than 80° C. and separating the native powder particles.

2. A cosmetic face-powder or eye-shadow compact powder product having a composition comprising from 0.1% to 99.9% by weight of at least one starch and from 99.9% to 0.1% by weight of cosmetically acceptable ingredients, wherein the starch is a powder starch consisting of native powder particles having a smooth surface and a lenticular/lamellar shape with diameter between 5 and 60 microns and thickness between 0.1 and 15 microns, and
the starch is obtained through an aqueous extraction process at a temperature less than 80° C. and separating the native powder particles.

3. The cosmetic eye-shadow compact powder product according to claim 2, wherein the composition comprises 40% by weight of ginger starch.

4. The cosmetic eye-shadow compact powder product according to claim 1, wherein the composition comprises 10% by weight of mung bean starch.

5. The cosmetic eye-shadow compact powder product according to claim 1, wherein the composition comprises 40% by weight of amaranth starch.

6. The cosmetic face-powder compact powder product according to claim 2, wherein the composition comprises 60% by weight of white turmeric starch.

7. The cosmetic face-powder compact powder product according to claim 1, wherein the composition comprises 60% by weight of white turmeric starch and 5% by weight of Chinese taro starch.

8. The cosmetic face-powder compact powder product according to claim 1, wherein the composition comprises 55% by weight of lenticular wheat starch of type A and 10% by weight of mung bean starch.

9. The cosmetic face-powder compact powder product according to claim 2, wherein the composition comprises 60% by weight of white turmeric starch and 5% by weight of Chinese taro starch.

10. The cosmetic face-powder compact powder product according to claim 2, wherein the composition comprises 55% by weight of lenticular wheat starch of type A and 10% by weight of mung bean starch.

* * * * *